US012583617B2

(12) United States Patent
Vijapur et al.

(10) Patent No.: US 12,583,617 B2
(45) Date of Patent: Mar. 24, 2026

(54) SYSTEMS AND METHODS FOR PROVIDING ALERTS REGARDING ENGAGEMENT OF AN EMERGENCY EXIT DOOR OF AN AIRCRAFT

(71) Applicant: THE BOEING COMPANY, Arlington, VA (US)

(72) Inventors: Lohit Vijapur, Karnataka (IN); Amar Patel, Karnataka (IN); Preethi Ashok Mikkal, Karnataka (IN); Sharanraj Shetty Karyahalla Santhosh, Karnataka (IN)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/417,117

(22) Filed: Jan. 19, 2024

(65) Prior Publication Data

US 2025/0236412 A1     Jul. 24, 2025

(51) Int. Cl.
B64D 45/00         (2006.01)
B64C 1/14          (2006.01)
E05B 77/24         (2014.01)

(52) U.S. Cl.
CPC .............. B64D 45/00 (2013.01); B64C 1/143 (2013.01); E05B 77/24 (2013.01)

(58) Field of Classification Search
CPC .......... B64D 45/00; B64C 1/143; E05B 77/24
USPC .................................................... 340/426.28
See application file for complete search history.

(56) References Cited

U.S. PATENT DOCUMENTS

| | | | |
|---|---|---|---|
| 2007/0176793 A1* | 8/2007 | Bruch ................ | B64D 45/0059 340/945 |
| 2014/0259935 A1 | 9/2014 | Steger | |
| 2016/0019770 A1* | 1/2016 | Bredemeier ........... | E05C 3/165 244/129.5 |

FOREIGN PATENT DOCUMENTS

| | | | |
|---|---|---|---|
| CN | 205554610 | 9/2016 | |
| DE | 20315136 U1 * | 2/2004 | ............. E05B 65/10 |
| EP | 2878530 | 2/2019 | |

OTHER PUBLICATIONS

Extended European Search Report for EP App. No. 25150354.6-1009, dated May 15, 2025.
A320 Mentor Channel: "Airbus A320 CBT # 36 Cabin Systems Operation", (Jun. 5, 2021) URL:https://www.youtube.com/watch?v=yffFvHgYXQE&ab_channel=A320MENTORchannel. [retrieved on May 5, 2025].

* cited by examiner

*Primary Examiner* — Kam Wan Ma
(74) *Attorney, Agent, or Firm* — Joseph M. Butscher; Carroll, Hoette & Butscher, LLC

(57)         ABSTRACT
An aircraft includes a system including an emergency exit door within the internal cabin. The emergency exit door includes a lever configured to be engaged to open the emergency exit door. A first cover is removably secured to the emergency exit door. The first cover is configured to be removed to gain access to the lever. A second cover is disposed between the lever and the first cover. The second cover is configured to be removed to gain access to the lever. One or more sensors are configured to detect positions of the first cover and the second cover.

20 Claims, 9 Drawing Sheets

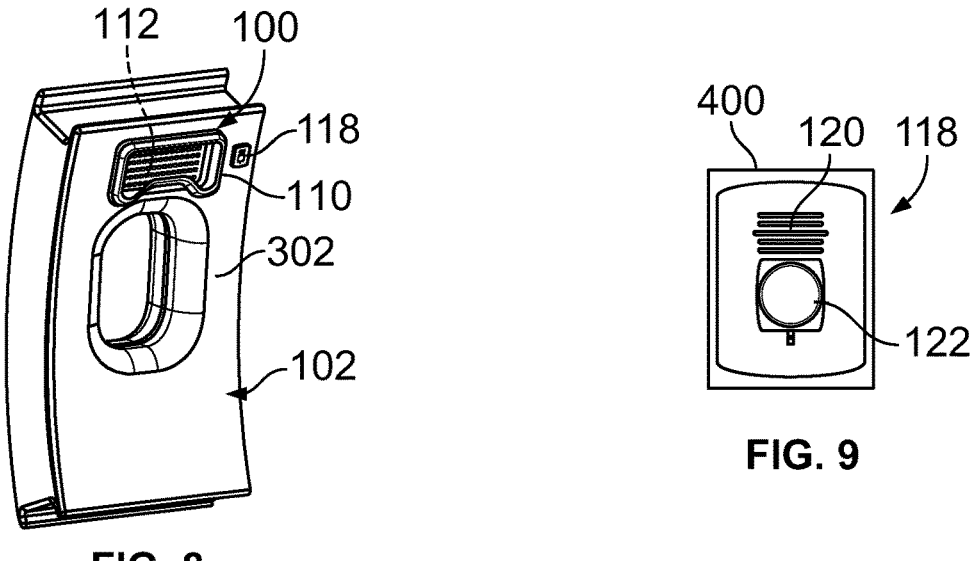
FIG. 8
FIG. 9
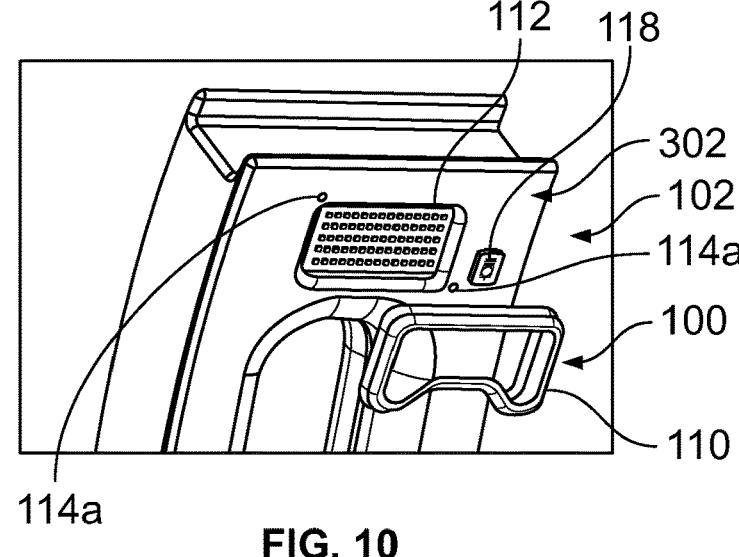
FIG. 10
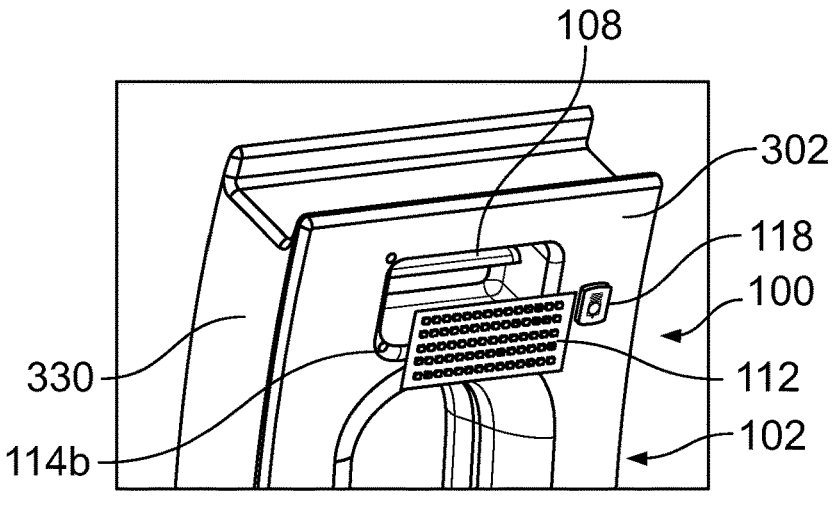
FIG. 11

SYSTEMS AND METHODS FOR PROVIDING ALERTS REGARDING ENGAGEMENT OF AN EMERGENCY EXIT DOOR OF AN AIRCRAFT

FIELD OF THE DISCLOSURE

Examples of the present disclosure generally relate to systems and methods for providing alerts regarding engagement of an emergency exit door of an aircraft.

BACKGROUND OF THE DISCLOSURE

Vehicles such as commercial aircraft are used to transport passengers between various locations. Typical commercial aircraft include emergency exit doors having levers configured to be pulled by an individual to open the emergency exit doors in the event of an evacuation.

A known emergency exit door includes a transparent cover disposed over the lever. In the event of an evacuation, the individual removes the transparent cover, and subsequently pulls the lever to open the emergency exit door. The transparent cover typically provides the only barrier between the lever and a passenger seating area within an internal cabin.

Curious passengers may be intrigued by the lever of an emergency exit door. Such passengers can easily remove the transparent cover, and engage the lever, even if there is no emergency. In short, an emergency exit door can be accidentally opened simply by removing the transparent cover, and pulling the lever. When the emergency exit door is opened, an alarm sounds, thereby alerting crew and passengers of the opening of the emergency exit door.

As can be appreciated, inadvertent or accidental opening of an emergency exit door can cause anxiety in passengers and crew. Further, such opening of the emergency exit door causes delays in flights.

SUMMARY OF THE DISCLOSURE

A need exists for a system and a method for providing an alert regarding an attempted engagement of an emergency exit door. Further, a need exists for a system and method for alerting individuals within an internal cabin of an aircraft of an engagement of the emergency exit door before such door is opened.

With those needs in mind, certain examples of the present disclosure provide a system including an emergency exit door for an internal cabin of an aircraft. The emergency exit door includes a lever configured to be engaged to open the emergency exit door. A first cover is removably secured to the emergency exit door. The first cover is configured to be removed to gain access to the lever. A second cover is disposed between the lever and the first cover. The second cover is configured to be removed to gain access to the lever.

In at least one example, the system also includes one or more sensors configured to detect positions of the first cover and the second cover. As a further example, the one or more sensors include one or more first sensors configured to detect the first cover, and one or more second sensors configured to detect the second cover.

In at least one example, the system also includes an alert device configured to output one or more alerts in response to removal of the first cover and the second cover. The alert device can be secured to the emergency exit door. The alert device can include a speaker and/or a light.

The one or more alerts can include a first alert in response to removal of the first cover, and a second alert in response to removal of the second cover. The first alert differs from the second alert.

In at least one example, the system also includes a control unit in communication with the one or more sensors. The control unit is configured to output one or more alert signals in response to removal of the first cover and the second cover.

The first cover can include an outer frame surrounding a transparent sheet. The second cover can include a flat panel having openings.

Certain examples of the present disclosure provide a vehicle, such as an aircraft, which includes an internal cabin, and a system, as described herein.

Certain examples of the present disclosure provide a system including an emergency exit door for an internal cabin of an aircraft. The emergency exit door includes a lever configured to be engaged to open the emergency exit door. One or more covers are removably secured to the emergency exit door. The one or more covers are configured to be removed to gain access to the lever. One or more sensors are configured to detect positions of the first cover and the second cover.

Certain examples of the present disclosure provide a method including removably securing a first cover to an emergency exit door of an aircraft, wherein the first cover is configured to be removed to gain access to a lever; and removably securing a second cover between the lever and the first cover, wherein the second cover is configured to be removed to gain access to the lever. In at least one example, the method also includes detecting, by one or more sensors, positions of the first cover and the second cover. In at least one example, the method also includes outputting, by an alert device, one or more alerts in response to removal of the first cover and the second cover. In at least one example, the method also includes outputting, by a control unit in communication with the one or more sensors, one or more alert signals in response to removal of the first cover and the second cover.

BRIEF DESCRIPTION OF THE DRAWINGS

FIG. 8 illustrates an isometric front view of an emergency exit door, according to an example of the present disclosure.

FIG. 9 illustrates a front view of an alert device, according to an example of the present disclosure.

FIG. 10 illustrates a front view of the system having a first cover removed, according to an example of the present disclosure.

FIG. 11 illustrates a front view of the system having a second cover removed, according to an example of the present disclosure.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Figure 1:
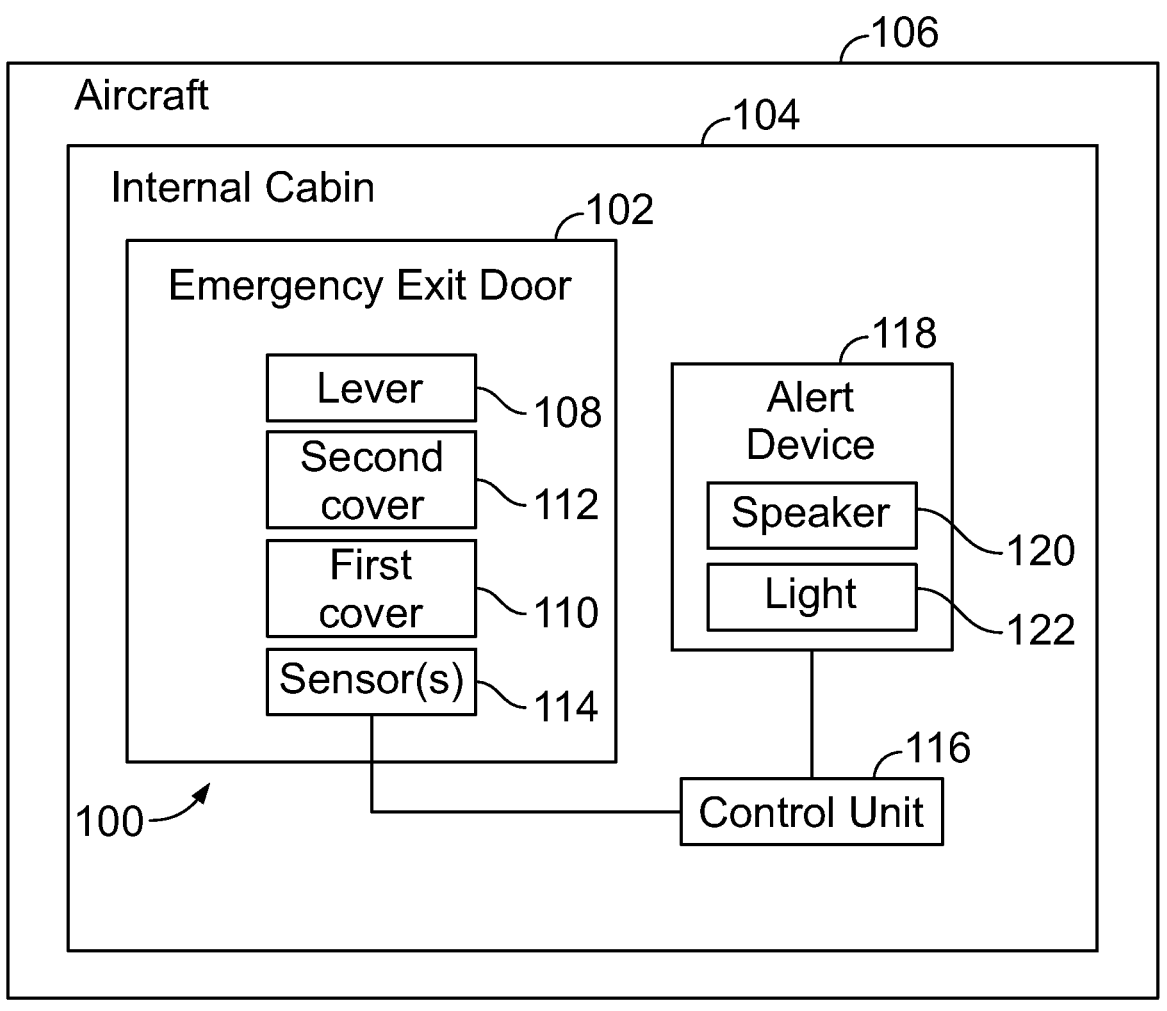
FIG. 1 illustrates a block diagram of a system, according to an example of the present disclosure.

FIG. 1 illustrates a block diagram of a system 100, according to an example of the present disclosure. The system 100 includes an emergency exit door 102 within an internal cabin 104 of an aircraft 106. The emergency exit door 102 can be disposed proximate to (such as over a portion of) a wing of the aircraft 106. The emergency exit door 102 is configured to be moved between a closed position, and an open position.

The emergency exit door 102 includes a lever 108 that is configured to be engaged, such as grasped and pulled, by an individual to open the emergency exit door 102. A first cover 110 is disposed over the lever 108. A second cover 112 is disposed between the lever 108 and the first cover 110. In order to engage the lever 108, the first cover 110 and the second cover 112 are removed to allow access to the lever 108.

One or more sensors 114 are proximate to the first cover 110 and the second cover 112. For example, one or more first sensors 114 are proximate to the first cover 110, and one or more second sensors 114 are proximate to the second cover 112. The sensor(s) 114 are configured to detect when the first cover 110 and the second cover 112 are removed. In at least one example, the sensors 114 are mounted on and/or within the emergency exit door 102.

In at least one example, the sensors 114 are proximity sensors configured to detect a position of the first cover 110 and the second cover 112. For example, the sensors 114 can be ultrasonic sensors. As another example, the sensors 114 can be infrared sensors. As another example, the sensors 114 can be inductive, capacitive, or photoelectric sensors. As another example, the sensors 114 can be mechanical sensors, such as can include springs, detents, and/or the like, which are configured to detect pressure.

The sensors 114 are in communication with a control unit 116, such as through one or more wired or wireless connections. The control unit 116 can be disposed on or within the emergency exit door 102. As another example, the control unit 116 can be remote from the emergency exit door 102, such as on or within a frame, wall, ceiling, floor, or the like.

In at least one example, an alert device 118 is also in communication with the control unit 116, such as through one or more wired or wireless connections. The alert device 118 can be secured to (such as mounted or otherwise disposed on or within) the emergency exit door 102, such as facing a passenger seating area of the internal cabin 104. Optionally, the alert device 118 can be remote from the emergency exit door 102, such as on or within a frame, wall, ceiling, floor, or the like. For example, the alert device 118 can be within a flight deck, cockpit, galley, crew rest area, and/or the like.

In at least one example, the alert device 118 includes a speaker 120 and a light 122. The speaker 120 is configured to broadcast audio signals within the internal cabin 104. The light 122 can be one or more of an incandescent light, one or more light emitting diodes (LEDs), a strobe light, and/or the like. Optionally, the alert device 118 can include only one of the speaker 120 or the light 122.

Optionally, the system 100 may not include the alert device 118. Instead, the control unit 116 can be in communication with a computer, handheld device, or the like, such as of crew within the aircraft 106.

Optionally, the system 100 may not include the control unit 116. Instead, the sensor(s) 114 can be in communication with the alert device 118 and configured to automatically trigger the alert device 118 in response to a detected change of the first cover 110 and/or the second cover 112.

In operation, the sensor(s) 114 detect when the first cover 110 and the second cover 112 are in covering positions. For example, the sensor(s) 114 detect a distance between the first cover 110 and the second cover 112 in the covering positions. The sensor(s) 114 output a covering signal regarding the covering positions of the first cover 110 and the second cover 112. When the first cover 110 and the second cover 112 are in removed positions, the sensor(s) 114 detect a change in distance in relation to the first cover 110 and the second cover 112. In response to the change, the sensor(s) 114 output a removal signal to the control unit 116 indicating that the first cover 110 and/or the second cover 112 has been removed. In at least one example, the sensor(s) 114 do not output the covering signal. Instead, in this example, the sensor(s) 114 only output the removal signal in response to detecting that the first cover 110 and/or the second cover 112 has been removed.

When the first cover 110 is removed, the sensor(s) 114 output a first removal signal to the control unit 116. In response to receiving the first removal signal, the control unit 116 outputs a first alert signal to the alert device 118. The first alert signal causes the alert device 118 to provide a first alert, such as a first alert broadcast through the speaker 120 and/or a first lighting indication shown by the light 122. For example, the first alert can be an auditory message indicating that the first cover 110 has been removed and an emergency exit door 102 has been engaged. The first alert is configured to alert individuals within the internal cabin 104 that an individual is attempting to engage the emergency exit door 102, which, in the case of a non-emergency, may cause the individual to refrain from further engagement, and/or allow others to persuade the individual to refrain from engaging the emergency exit door 102.

If the individual continues to engage the emergency exit door 102 by engaging the second cover 112 and removing the second cover 112 to gain access to the lever 108, the sensor(s) 114 output a second removal signal to the control unit 116. In response to receiving the second removal signal, the control unit 116 outputs a second alert signal to the alert device 118. The second alert signal causes the alert device 118 to provide a second alert, such as a second alert broadcast through the speaker 120 and/or a second lighting indication shown by the light 122. For example, the second alert can be an auditory message indicating that the second cover 112 has been removed and an emergency exit door 102 has been engaged. The second alert can have an increased intensity in relation to the first alert. For example, the second alert can be louder (as broadcast through the speaker 120) and/or brighter (such as an illuminated flashing light) than the first alert. The second alert is configured to alert individuals within the internal cabin 104 that an individual is attempting to further engage the emergency exit door 102, which, in the case of a non-emergency, may cause the individual to refrain from further engagement, and/or allow others to persuade the individual to refrain from further engaging the emergency exit door 102.

If the individual continues to engage the emergency exit door 102 by grasping and pulling the lever, the control unit 116 (which can be in communication with the lever 108 such as through one or more wired or wireless connections) outputs an opening signal to the alert device 118. The opening signal causes the alert device 118 to provide a third or opening alert, such as broadcast through the speaker 120 and/or shown through the light 122, indicating that the emergency exit door 102 has been opened.

As described herein, in at least one example, the system 100 includes the emergency exit door 102 for the internal cabin 104 of the aircraft 106. The emergency exit door 102 includes the lever 108 configured to be engaged to open the emergency exit door 102. The first cover 110 is removably secured to the emergency exit door 102. The first cover 110 is configured to be removed to gain access to the lever 108. The second cover 112 is disposed between the lever 108 and the first cover 110. The second cover 112 is configured to be removed to gain access to the lever 108.

One or more sensors 114 are configured to detect positions of the first cover 110 and the second cover 112. For example, one or more first sensors are configured to detect the first cover 110, and one or more second sensors are configured to detect the second cover 112.

The alert device 118 is configured to output one or more alerts in response to removal of the first cover 110 and the second cover 112. The alert device 118 includes one or both of the speaker 120 or the light 122. The alerts can include a first alert in response to removal of the first cover 110, and a second alert in response to removal of the second cover 112. The first alert differs from the second alert.

In at least one example, the control unit 116 is in communication with the sensors 114. The control unit 116 is configured to output one or more alert signals in response to removal of the first cover 110 and the second cover 112.

Figure 2:
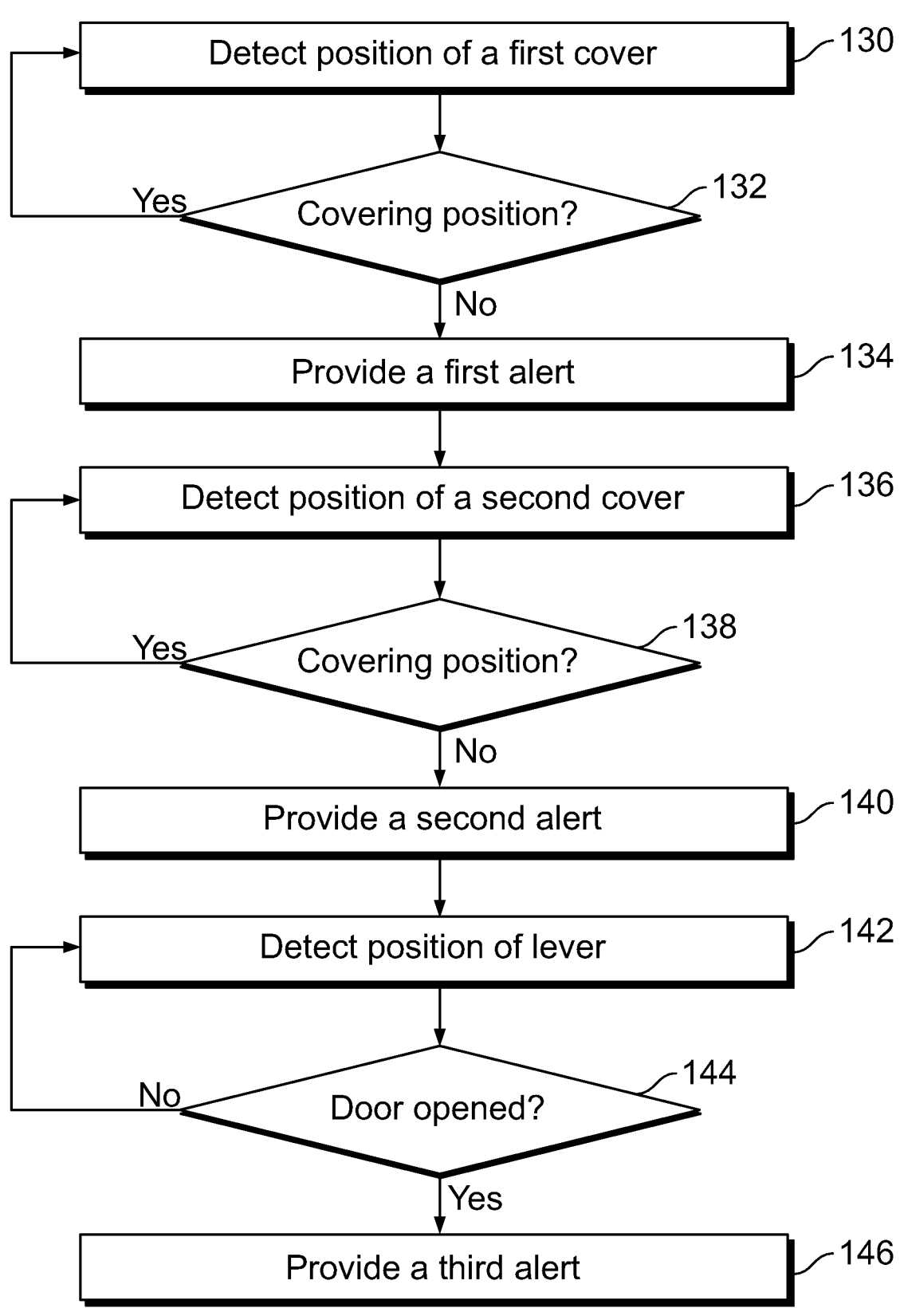
FIG. 2 illustrates a flow chart of a method, according to an example of the present disclosure.

FIG. 2 illustrates a flow chart of a method, according to an example of the present disclosure. Referring to FIGS. 1 and 2, at 130, a position of the first cover 110 is detected by the sensor(s) 114. At 132, the control unit 116 determines if the first cover 110 is in a first covering position, via communication with the sensor(s) 114. If the first cover 110 is in the first covering position, the method returns to 130.

If, however, the first cover 110 is not in the first covering position (such as in a first removed position), the method proceeds from 132 to 134, at which the control unit 116 provides a first alert through the alert device 118. The first alert can be an audio signal broadcast through the speaker 120, and/or an illumination (such as an illuminated colored lighting signal, a flickering or flashing lighting signal, and/or the like) shown by the light 122.

At 136, a position of the second cover 112 (which is disposed closer to the lever 108 than the first cover 110) is detected by the sensor(s) 114. At 138, the control unit 116 determines if the second cover 112 is in a second covering position, via communication with the sensor(s) 114. If the second cover 112 is in the second covering position, the method returns to 136.

If, however, the second cover 112 is not in the second covering position (such as in a second removed position), the method proceeds from 138 to 140, at which the control unit 116 provides a second alert through the alert device 118. The second alert differs from the first alert, and can be an audio signal broadcast through the speaker 120, and/or an illumination (such as an illuminated colored lighting signal, a flickering or flashing lighting signal, and/or the like) shown by the light 122.

At 142, a position of the lever 108 is then detected. At 144, the control unit 116 determines if the emergency exit door 102 is opened, such as through communication with the lever 108. If not, the method returns to 142. If so, the method proceeds from 144 to 146, at which the control unit 116 provides a third alert through the alert device 118. The third alert can be a door opened alert. Optionally, the method may not include steps 142-146. Also, alternatively, the method may not include steps 136-140.

Figure 3:
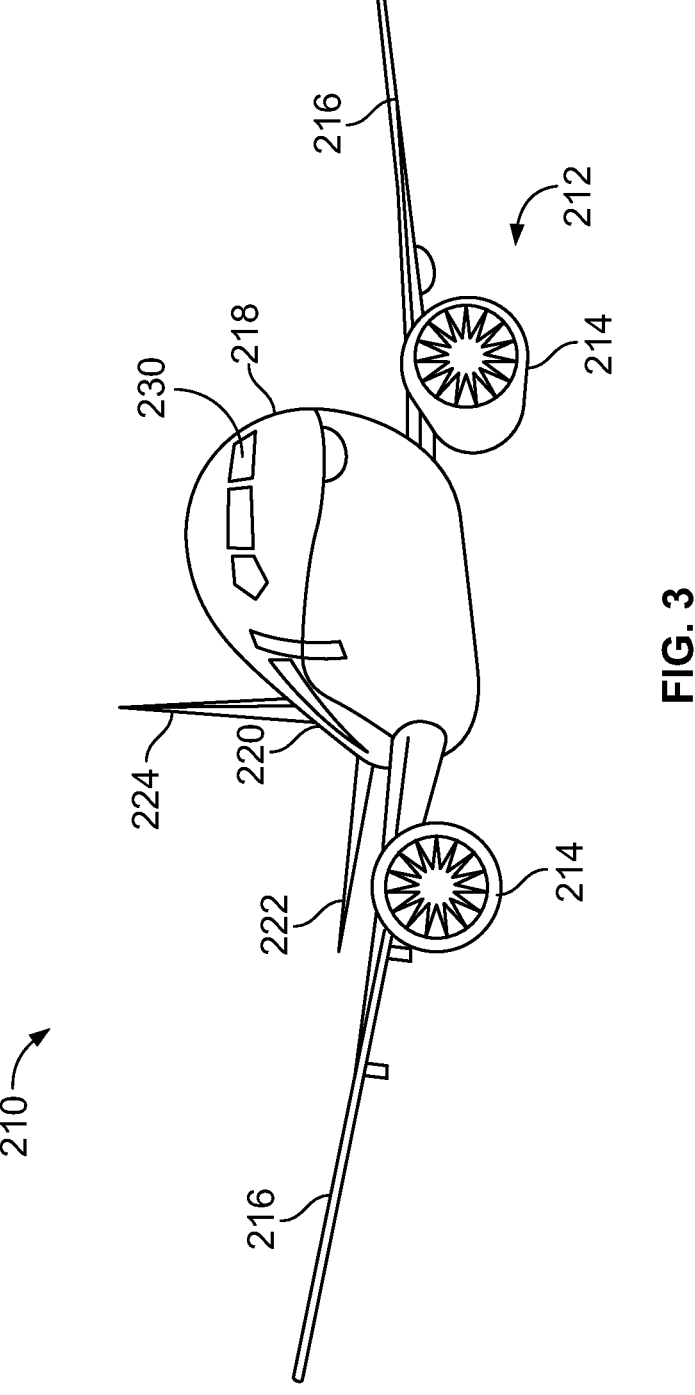
FIG. 3 illustrates a perspective front view of an aircraft, according to an example of the present disclosure.

FIG. 3 illustrates a perspective front view of an aircraft 210, according to an example of the present disclosure. The aircraft 210 is an example of the aircraft 106, shown in FIG. 1. The aircraft 210 includes a propulsion system 212 that includes engines 214, for example. Optionally, the propulsion system 212 may include more engines 214 than shown. The engines 214 are carried by wings 216 of the aircraft 210. In other examples, the engines 214 may be carried by a fuselage 218 and/or an empennage 220. The empennage 220 may also support horizontal stabilizers 222 and a vertical stabilizer 224.

The fuselage 218 of the aircraft 210 defines an internal cabin 230, which includes a flight deck, one or more work sections (for example, galleys, personnel carry-on baggage areas, and the like), one or more passenger sections (for example, first class, business class, and coach sections), one or more lavatories, and/or the like. The internal cabin 230 is an example of the internal cabin 104, as shown in FIG. 1.

Alternatively, instead of an aircraft, examples of the present disclosure may be used with various other vehicles, such as automobiles, buses, locomotives and train cars, watercraft, and the like. Further, examples of the present disclosure may be used with respect to fixed structures, such as commercial and residential buildings.

Figures 4A, 4B:
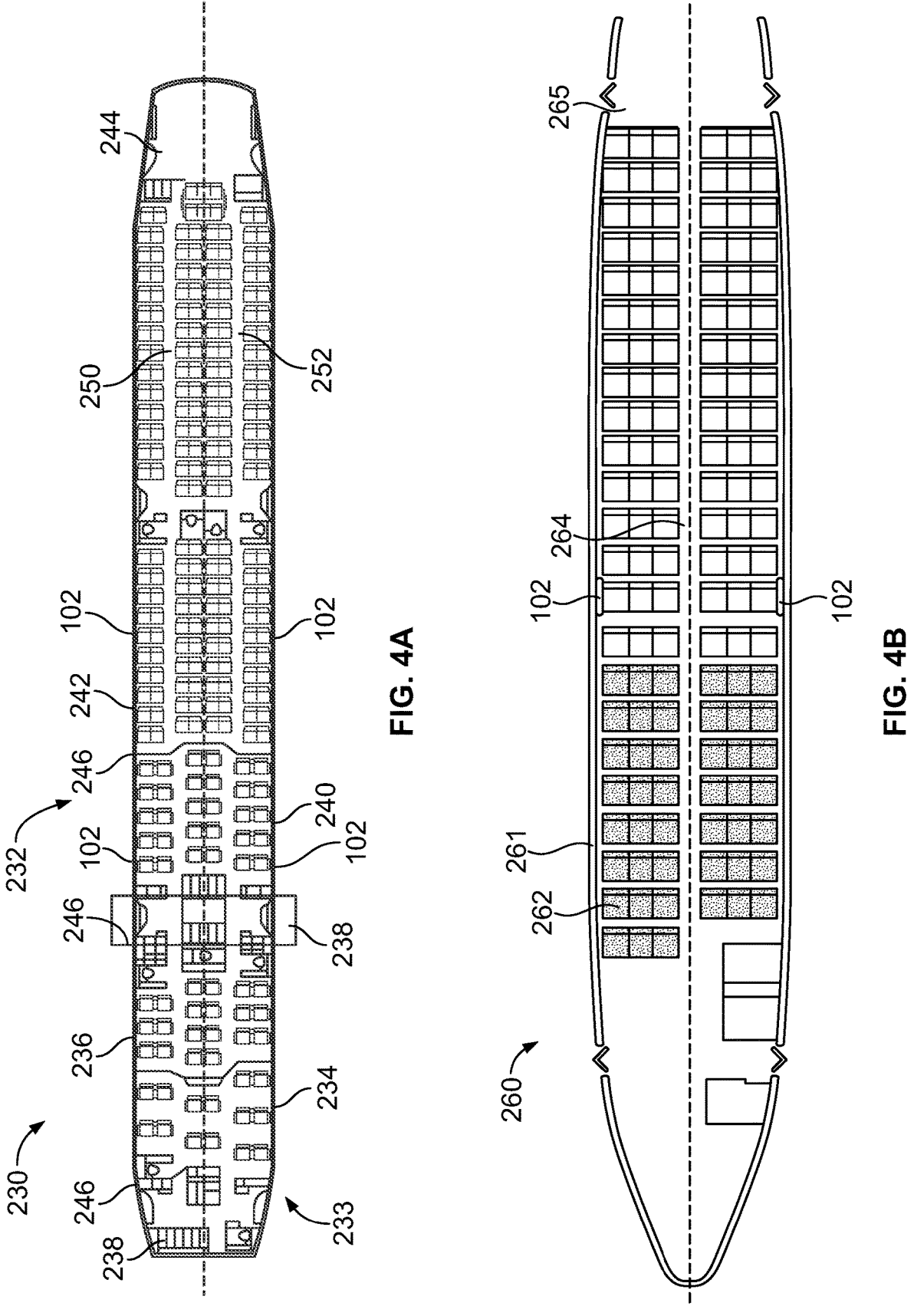
FIG. 4A illustrates a top plan view of an internal cabin of an aircraft, according to an example of the present disclosure.
FIG. 4B illustrates a top plan view of an internal cabin of an aircraft, according to an example of the present disclosure.

FIG. 4A illustrates a top plan view of an internal cabin 230 of an aircraft, according to an example of the present disclosure. The internal cabin 230 may be within the fuselage 232 of the aircraft, such as the fuselage 218 of FIG. 3. For example, one or more fuselage walls may define the internal cabin 230. The internal cabin 230 includes multiple areas, including a front section 233, a first-class section 234, a business class section 236, one or more galley stations 238, an expanded economy or coach section 240, a standard economy of coach section 242, and an aft section 244. It is to be understood that the internal cabin 230 may include more or less areas than shown. For example, the internal cabin 230 may not include a first-class section, and may include more or less galley stations than shown. Each of the sections may be separated by a cabin transition area 246, which may include class divider assemblies between aisles.

As shown in FIG. 4A, the internal cabin 230 includes two aisles 250 and 252 that lead to the aft section 244. Optionally, the internal cabin 230 may have fewer or more aisles than shown. For example, the internal cabin 230 may include a single aisle that extends through the center of the internal cabin 230 that leads to the aft section 244.

Emergency exit doors 102 are located within the internal cabin 230. The emergency exit doors 102 are configured as shown and described herein.

FIG. 4B illustrates a top plan view of an internal cabin 260 of an aircraft, according to an example of the present disclosure. The internal cabin 260 is an example of the internal cabin 230 shown in FIG. 3. The internal cabin 260 may be within a fuselage 261 of the aircraft. For example, one or more fuselage walls may define the internal cabin 260. The internal cabin 260 includes multiple areas, including a main cabin 262 having passenger seats, and an aft section 265 behind the main cabin 262. It is to be understood that the internal cabin 260 may include more or less areas than shown.

The internal cabin 260 may include a single aisle 264 that leads to the aft section 265. The single aisle 264 may extend through the center of the internal cabin 260 that leads to the aft section 265. For example, the single aisle 264 may be coaxially aligned with a central longitudinal plane of the internal cabin 260. The aisle can optionally be offset from a centerline of the fuselage.

Emergency exit doors 102 are located within the internal cabin 260. The emergency exit doors 102 are configured as shown and described herein.

Figure 5:
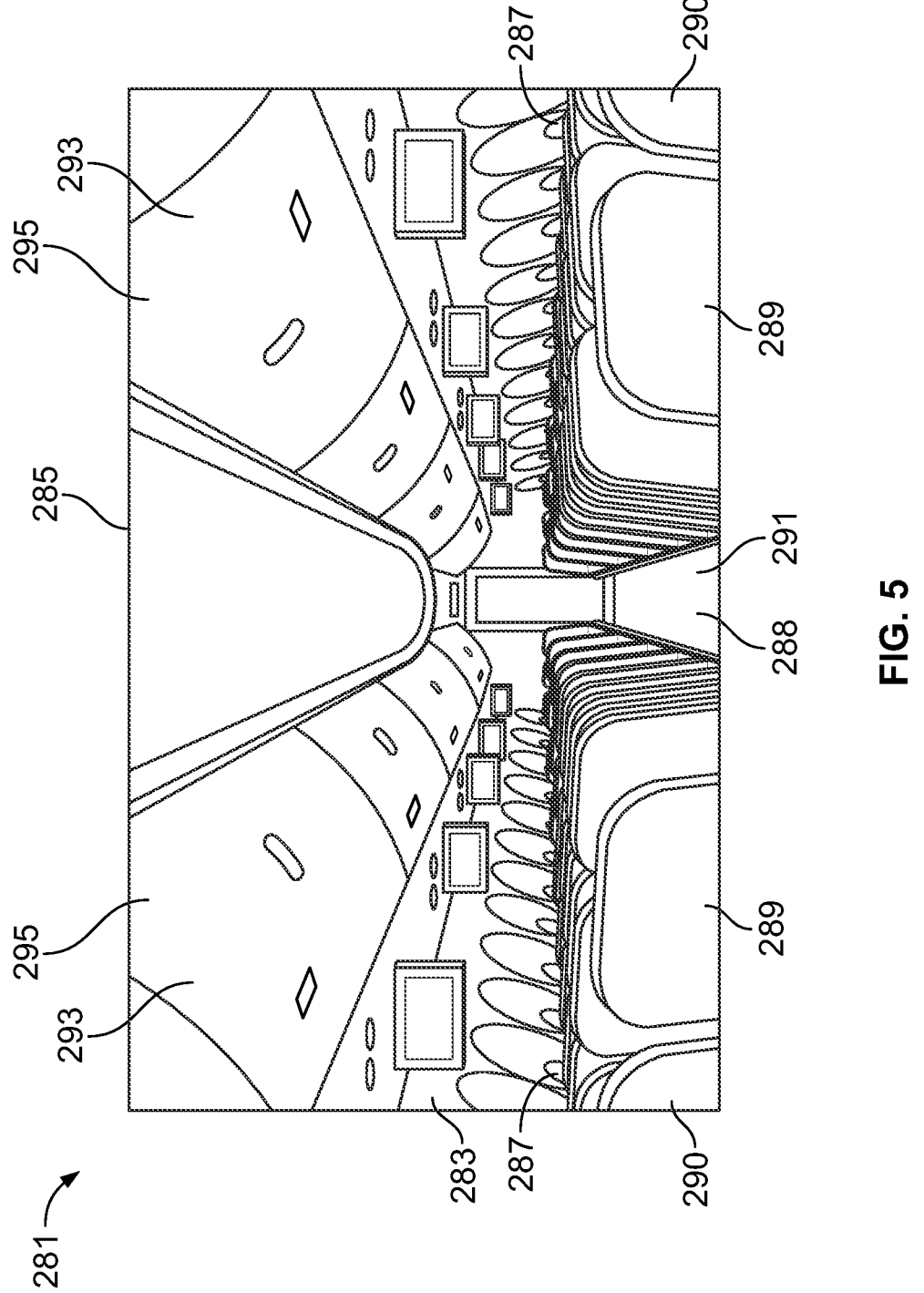
FIG. 5 illustrates a perspective interior view of an internal cabin of an aircraft, according to an example of the present disclosure.

FIG. 5 illustrates a perspective interior view of an internal cabin 281 of an aircraft, according to an example of the present disclosure. The internal cabin 281 is an example of the internal cabin 104 shown in FIG. 1. The internal cabin 281 includes outboard walls 283 connected to a ceiling 285. Windows 287 may be formed within the outboard walls 283. A floor 288 supports rows of seats 289. As shown in FIG. 5, a row 290 may include two seats 289 on either side of an aisle 291. However, the row 290 may include more or less seats 289 than shown. Additionally, the internal cabin 281 may include more aisles than shown.

Overhead stowage bin assemblies 293 are secured to the ceiling 285 and/or the outboard wall 283. The overhead stowage bin assemblies 293 are secured over the seats 289. The overhead stowage bin assemblies 293 extend between the front and rear end of the internal cabin 281. Each overhead stowage bin assembly 293 may include a pivot bin or bucket 295 pivotally secured to a strongback. The overhead stowage bin assemblies 293 are configured to be pivoted open in order to receive passenger carry-on baggage and personal items, for example.

Figure 6:
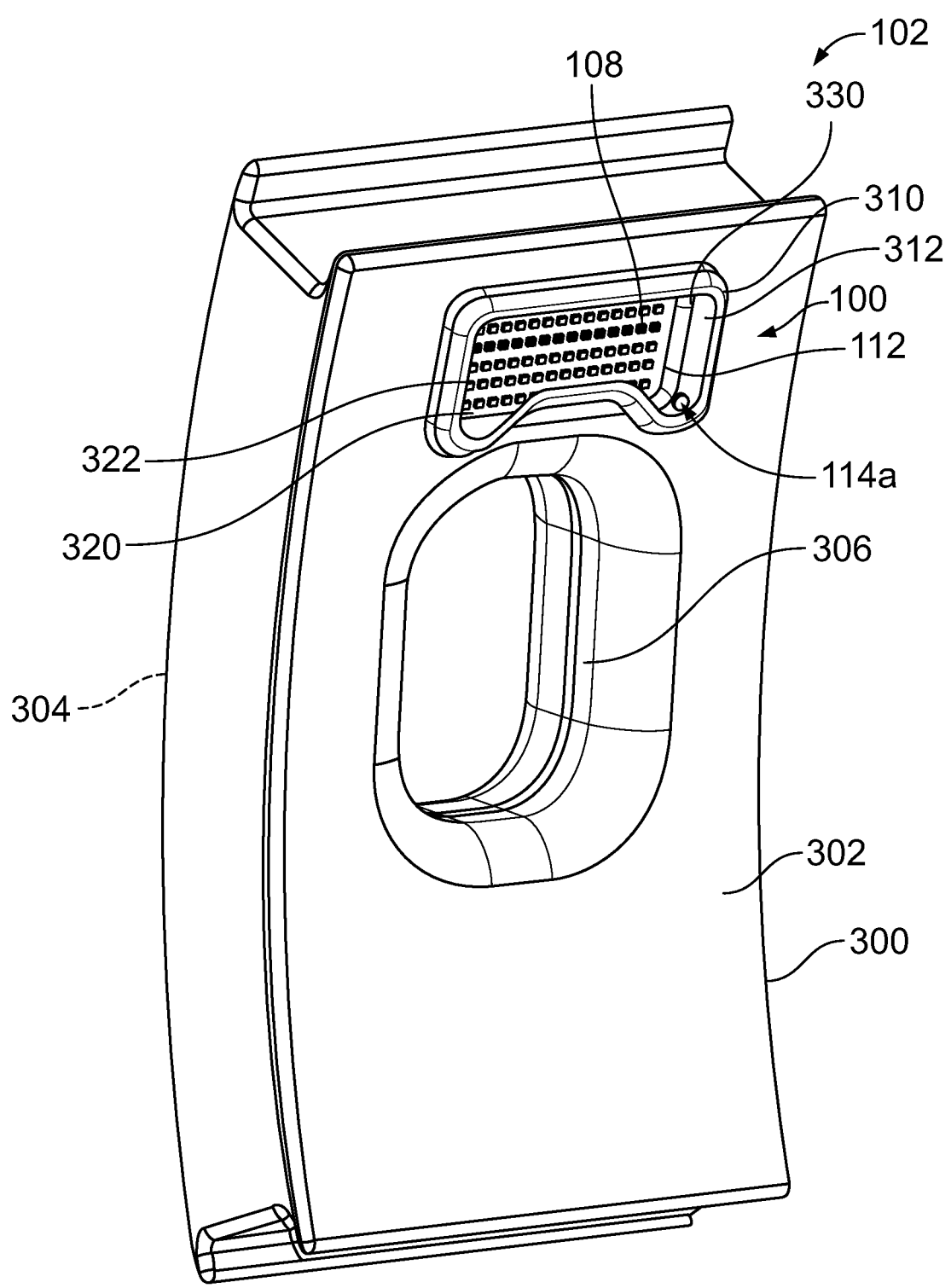
FIG. 6 illustrates an isometric front view of an emergency exit door, according to an example of the present disclosure.
Figure 7:
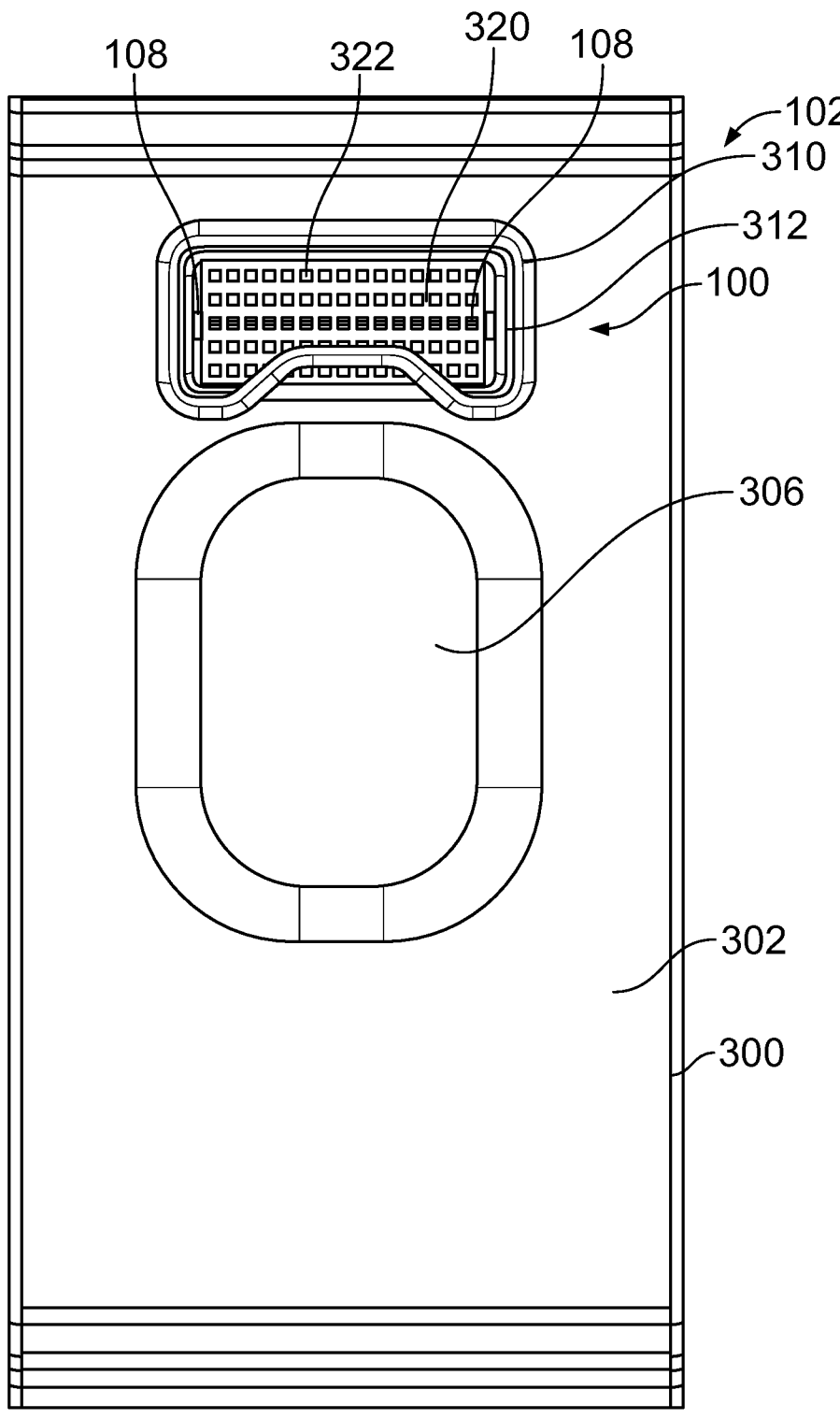
FIG. 7 illustrates a front view of the emergency exit door of FIG. 6.

FIG. 6 illustrates an isometric front view of an emergency exit door 102, according to an example of the present disclosure. FIG. 7 illustrates a front view of the emergency exit door 102 of FIG. 6. Referring to FIGS. 6 and 7, the emergency exit door 102 includes a main body 300 having a front face 302 and a rear face 304 opposite from the front face 302 When the emergency exit door 102 is in a closed position, the front face 302 is disposed toward a passenger seating area of an internal cabin, while the rear face 304 is disposed toward an outside of an aircraft.

In at least one example, a window 306 is formed within the emergency exit door 102. The window 306 is disposed within a channel that passes between and through the front face 302 and the rear face 304.

The first cover 110 is disposed above the window 306. The first cover 110 includes an outer frame 310 surrounding a transparent sheet 312, such as formed of transparent plastic, glass, or the like. The transparent sheet 312 allows viewing therethrough. As such, the second cover 112 is visible through the transparent sheet 312. The second cover 112 can be a flat panel 320 having a plurality of openings 322 formed therethrough. The flat panel 320 can be formed of plastic and/or metal, for example. The openings 322 allow at least a portion of the lever 108 to be seen therethrough. Optionally, the flat panel 320 may not include the openings 322.

The second cover 112 can also include an engagement member configured to be grasped and pulled by an individual. The engagement member can outwardly extend from the flat panel 320 toward the first cover 110 in the covering position. The engagement member can be a handle, strap, string, cable, and/or the like.

As shown, the lever 108 is disposed within a recess 330 (such as a pocket) formed in the main body 300. The second cover 112 is disposed within and/or over the recess 330. When the second cover 112 is in the covering position (as shown in FIG. 6), the second cover 112 is disposed between the lever 108 and the first cover 110. The first cover 110 in the covering position is disposed over the second cover 112, such as over and around the recess 330.

A first sensor 114a is secured to the main body 300. The first sensor 114a can be secured between the main body 300 surrounding the transparent sheet 312. The first sensor 114a is configured to detect the position of the first cover 110. One or more additional first sensors 114a can also be used. While hidden from view in FIGS. 6 and 7, a second sensor 114b is also secured to the main body 300, and configured to detect the position of the second cover 112. One or more additional second sensors 114b can also be used.

FIG. 8 illustrates an isometric front view of the emergency exit door 102, according to an example of the present disclosure. In this example, the alert device 118 can be secured to the front face 302, such as offset from a side of the first cover 110. Optionally, the alert device 118 can be secured to other structures within an internal cabin.

FIG. 9 illustrates a front view of the alert device 118, according to an example of the present disclosure. In at least one example, the alert device 118 includes a housing 400 that retains the speaker 120 and the light 122. Optionally, the speaker 120 and/or the light 122 can be directly mounted to the front face 302 (shown in FIG. 8) without a separate housing.

FIG. 10 illustrates a front view of the system 100 having the first cover 110 removed, according to an example of the present disclosure. As shown, the system 100 can include two or more first sensors 114a configured to detect a position of the first cover 110.

FIG. 11 illustrates a front view of the system 100 having the second cover 112 removed, according to an example of the present disclosure. As shown, the system 100 can include two or more second sensors 114b configured to detect a position of the second cover 112.

Figure 12:
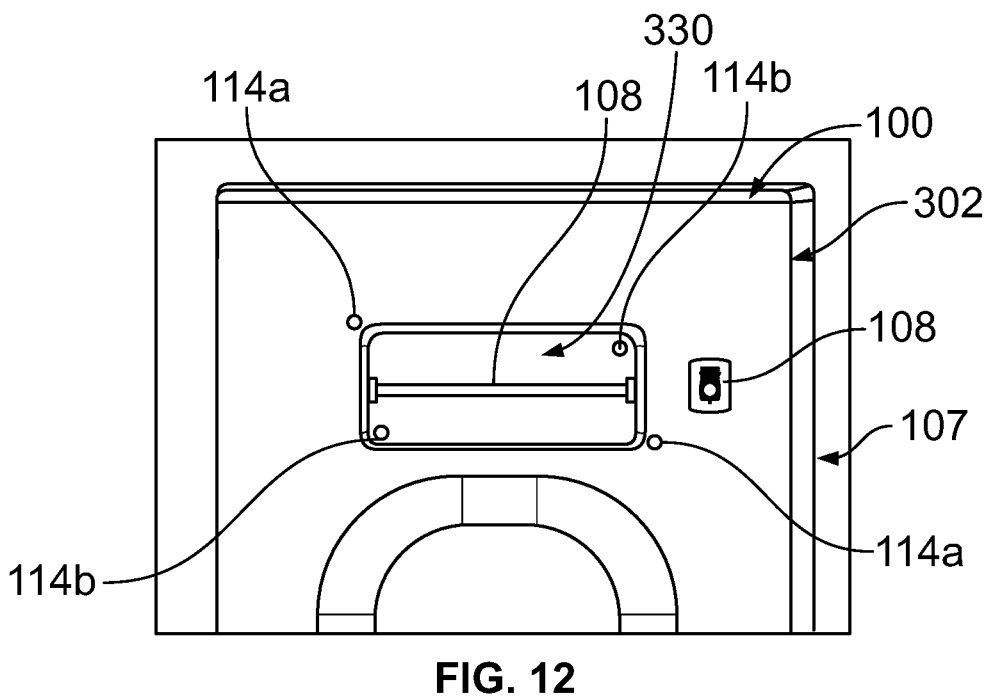
FIG. 12 illustrates a front view of a lever within a recess of the emergency exit door, according to an example of the present disclosure.

FIG. 12 illustrates a front view of the lever 108 within the recess 330 of the emergency exit door 102, according to an example of the present disclosure. In at least one example, the system 100 includes two first sensors 114a on the front face 302 (outside of the recess 330) configured to detect a position of the first cover 110 (shown in FIGS. 8 and 10, for example). The system 100 also includes two second sensors 114b within the recess 330 configured to detect a position of the second cover 112 (shown in FIGS. 8, 10, and 11). The system 100 can include fewer or more sensors than shown. Additionally, the sensors can be disposed at different locations than shown.

Figure 13:
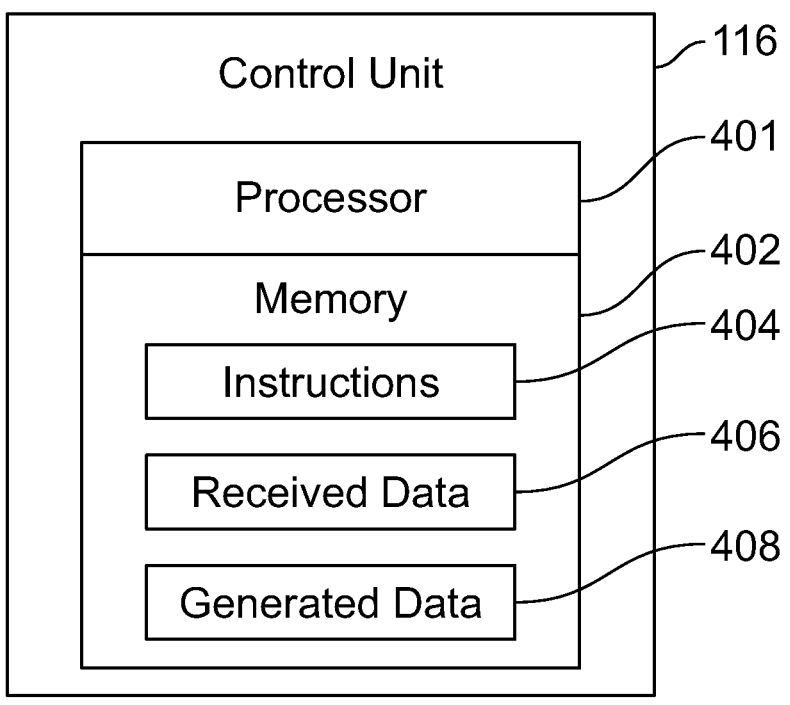
FIG. 13 illustrates a schematic block diagram of a control unit, according to an example of the present disclosure.

FIG. 13 illustrates a schematic block diagram of the control unit 116, according to an example of the present disclosure. In at least one example, the control unit 116 includes at least one processor 401 in communication with a memory 402. The memory 402 stores instructions 404, received data 406, and generated data 408. The control unit 116 shown in FIG. 13 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 116 may be or include one or more processors that are configured to control operation, as described herein.

The control unit 116 is configured to execute a set of instructions that are stored in one or more data storage units or elements (such as one or more memories), in order to process data. For example, the control unit 116 may include or be coupled to one or more memories. The data storage units may also store data or other information as desired or needed. The data storage units may be in the form of an information source or a physical memory element within a processing machine.

The set of instructions may include various commands that instruct the control unit 116 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 116. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 116 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-13, as described herein, examples of the present disclosure provide systems and methods that are configured to prevent unnecessary opening of the emergency exit door 102. The systems and methods are efficient, effective, safe, reliable, and comply with regulations promulgated from authorities, such as the United States Federal Aviation Administration (FAA). The systems and methods are configured to detect unnecessary opening of emergency exit doors.

In at least one example, the systems and methods described herein provide a dual stage alarm, having one or more first sensors 114a located between the front face 302 and the first cover 110. When the sensor(s) detect movement of the first cover 110, the alert device 118 outputs a first alert, such as in the form of blaring sound and high intensity flickering lights, which alerts passengers and crew of engagement of the emergency exit door 102. In the second stage, if an individual is still insistent on opening the emergency exit door 102 and removing the second cover 112, one or more second sensors 114b detect movement of the second cover 112, and the alert device 118 outputs a second alert, which can have an increased intensity in relation to the first alert.

The systems and methods described herein are configured to alert passengers and crew of an unnecessary attempted opening of an emergency exit door, allowing a response thereto before the emergency exit door is actually opened. As such, the systems and methods described herein prevent injuries to individuals, and prevent damage to aircraft.

Further, the disclosure comprises embodiments according to the following clauses:

Clause 1. A system comprising:
an emergency exit door for an internal cabin of an aircraft, the emergency exit door comprising a lever configured to be engaged to open the emergency exit door;
a first cover removably secured to the emergency exit door, wherein the first cover is configured to be removed to gain access to the lever; and
a second cover disposed between the lever and the first cover, wherein the second cover is configured to be removed to gain access to the lever.

Clause 2. The system of Clause 1, further comprising one or more sensors configured to detect positions of the first cover and the second cover.

Clause 3. The system of Clause 2, wherein the one or more sensors comprise:
one or more first sensors configured to detect the first cover; and
one or more second sensors configured to detect the second cover.

Clause 4. The system of Clauses 2 or 3, further comprising an alert device configured to output one or more alerts in response to removal of the first cover and the second cover.

Clause 5. The system of Clause 4, wherein the alert device is secured to the emergency exit door.

Clause 6. The system of Clauses 4 or 5, wherein the alert device comprises one or both of a speaker or a light.

Clause 7. The system of any of Clauses 4-6, wherein the one or more alerts comprise a first alert in response to removal of the first cover, and a second alert in response to removal of the second cover.

Clause 8. The system of Clause 7, wherein the first alert differs from the second alert.

Clause 9. The system of any of Clauses 2-8, further comprising a control unit in communication with the one or more sensors, wherein the control unit is configured to output one or more alert signals in response to removal of the first cover and the second cover.

Clause 10. The system of any of Clauses 1-9, wherein the first cover comprises an outer frame surrounding a transparent sheet.

Clause 11. The system of any of Clauses 1-10, wherein the second cover comprises a flat panel having openings.

Clause 12. An aircraft comprising:

an internal cabin; and a system comprising:

an emergency exit door within the internal cabin, the emergency exit door comprising a lever configured to be engaged to open the emergency exit door;

a first cover removably secured to the emergency exit door, wherein the first cover is configured to be removed to gain access to the lever;

a second cover disposed between the lever and the first cover, wherein the second cover is configured to be removed to gain access to the lever;

one or more sensors configured to detect positions of the first cover and the second cover;

a control unit in communication with the one or more sensors, wherein the control unit is configured to output one or more alert signals in response to removal of the first cover and the second cover; and an alert device configured to output one or more alerts in response to removal of the first cover and the second cover.

Clause 13. The aircraft of Clause 12, wherein the one or more sensors comprise:

one or more first sensors configured to detect the first cover; and one or more second sensors configured to detect the second cover.

Clause 14. The aircraft of Clauses 12 or 13, wherein the alert device is secured to the emergency exit door.

Clause 15. The aircraft of any of Clauses 12-14, wherein the alert device comprises one or both of a speaker or a light.

Clause 16. The aircraft of any of Clauses 12-15, wherein the one or more alerts comprise a first alert in response to removal of the first cover, and a second alert in response to removal of the second cover, and wherein the first alert differs from the second alert.

Clause 17. The aircraft of any of Clauses 12-16, wherein the first cover comprises an outer frame surrounding a transparent sheet, and wherein the second cover comprises a flat panel having openings.

Clause 18. A system comprising:

an emergency exit door for an internal cabin of an aircraft, the emergency exit door comprising a lever configured to be engaged to open the emergency exit door;

one or more covers removably secured to the emergency exit door, wherein the one or more covers are configured to be removed to gain access to the lever; and one or more sensors configured to detect positions of the first cover and the second cover.

Clause 19. The system of Clause 18, wherein the one or more covers comprise:

a first cover removably secured to the emergency exit door, wherein the first cover is configured to be removed to gain access to the lever; and a second cover disposed between the lever and the first cover, wherein the second cover is configured to be removed to gain access to the lever, and wherein the one or more sensors comprise:

one or more first sensors configured to detect the first cover; and one or more second sensors configured to detect the second cover.

Clause 20. The system of Clause 18, further comprising:

a control unit in communication with the one or more sensors, wherein the control unit is configured to output one or more alert signals in response to removal of the first cover and the second cover; and an alert device configured to output one or more alerts in response to removal of the first cover and the second cover, wherein the alert device comprises one or both of a speaker or a light.

Clause 21. A method comprising:

removably securing a first cover to an emergency exit door of an aircraft, wherein the first cover is configured to be removed to gain access to a lever; and removably securing a second cover between the lever and the first cover, wherein the second cover is configured to be removed to gain access to the lever.

Clause 22. The method of Clause 21, further comprising detecting, by one or more sensors, positions of the first cover and the second cover.

Clause 23. The method of Clause 21 or 22, further comprising outputting, by an alert device, one or more alerts in response to removal of the first cover and the second cover.

Clause 24. The method of any of Clauses 21-23, further comprising outputting, by a control unit in communication with the one or more sensors, one or more alert signals in response to removal of the first cover and the second cover.

As described herein, examples of the present disclosure provide systems and methods for providing an alert regarding an attempted engagement of an emergency exit door. Further, examples of the present disclosure provide systems and methods for alerting individuals within an internal cabin of an aircraft of an engagement of the emergency exit door before such door is opened.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, aft may be changed to forward, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
an emergency exit door for an internal cabin of an aircraft, the emergency exit door comprising a lever configured to be engaged to open the emergency exit door;
a first cover removably secured to the emergency exit door, wherein the first cover is configured to be removed to gain access to the lever; and
a second cover disposed between the lever and the first cover, wherein the second cover is configured to be removed to gain access to the lever.

2. The system of claim 1, further comprising one or more sensors.

3. The system of claim 2, wherein the one or more sensors comprise:
a first sensor configured to detect the first cover; and
a second sensor configured to detect the second cover.

4. The system of claim 2, further comprising an alert device configured to output one or more alerts in response to removal of the first cover and the second cover.

5. The system of claim 4, wherein the alert device is secured to the emergency exit door.

6. The system of claim 4, wherein the alert device comprises one or both of a speaker or a light.

7. The system of claim 4, wherein the one or more alerts comprise a first alert in response to removal of the first cover, and a second alert in response to removal of the second cover.

8. The system of claim 7, wherein the first alert differs from the second alert.

9. The system of claim 2, further comprising a control unit in communication with the one or more sensors, wherein the control unit is configured to output one or more alert signals in response to removal of the first cover and the second cover.

10. The system of claim 1, wherein the first cover comprises an outer frame surrounding a transparent sheet.

11. The system of claim 1, wherein the second cover comprises a flat panel having openings.

12. An aircraft comprising:
an internal cabin; and
a system comprising:
an emergency exit door within the internal cabin, the emergency exit door comprising a lever configured to be engaged to open the emergency exit door;
a first cover removably secured to the emergency exit door, wherein the first cover is configured to be removed to gain access to the lever;
a second cover disposed between the lever and the first cover, wherein the second cover is configured to be removed to gain access to the lever;
one or more sensors configured to detect positions of the first cover and the second cover;
a control unit in communication with the one or more sensors, wherein the control unit is configured to output one or more alert signals in response to removal of the first cover and the second cover; and
an alert device configured to output one or more alerts in response to removal of the first cover and the second cover.

13. The aircraft of claim 12, wherein the one or more sensors comprise:
one or more first sensors configured to detect the first cover; and
one or more second sensors configured to detect the second cover.

14. The aircraft of claim 12, wherein the alert device is secured to the emergency exit door.

15. The aircraft of claim 12, wherein the alert device comprises one or both of a speaker or a light.

16. The aircraft of claim 12, wherein the one or more alerts comprise a first alert in response to removal of the first cover, and a second alert in response to removal of the second cover, and wherein the first alert differs from the second alert.

17. The aircraft of claim 12, wherein the first cover comprises an outer frame surrounding a transparent sheet, and wherein the second cover comprises a flat panel having openings.

18. A system comprising:
an emergency exit door for an internal cabin of an aircraft, the emergency exit door comprising a lever configured to be engaged to open the emergency exit door;
a first cover removably secured to the emergency exit door, wherein the first cover is configured to be removed to gain access to the lever;
a second cover disposed between the lever and the first cover, wherein the second cover is configured to be removed to gain access to the lever;
one or more first sensors configured to detect one or more first positions of the first cover; and
one or more second sensors configured to detect one of more second positions of the second cover.

19. The system of claim 18, further comprising a control unit in communication with the one or more first sensors and the one or more second sensors, wherein the control unit is configured to output one or more alert signals in response to removal of the first cover and the second cover.

20. The system of claim 19, further comprising an alert device configured to output one or more alerts in response to removal of the first cover and the second cover, wherein the alert device comprises one or both of a speaker or a light.

* * * * *